United States Patent [19]

Kumazaki et al.

[11] Patent Number: 5,294,156
[45] Date of Patent: Mar. 15, 1994

[54] FLANGE COUPLING FOR CONNECTING PIPES FOR CARRYING REFRIGERANT DURING REFRIGERATING CYCLE

[75] Inventors: Kouzi Kumazaki, Okazaki; Kenji Ogura, Kariya; Hiroshi Imaida; Tatsuhisa Hayashi, both of Okazaki, all of Japan

[73] Assignee: Nippondenso Co., Ltd., Kariya, Japan

[21] Appl. No.: 838,100

[22] Filed: Feb. 20, 1992

[30] Foreign Application Priority Data

Feb. 20, 1991 [JP] Japan ................... 3-26325

[51] Int. Cl.⁵ .................... F16L 3/22; F16L 23/02
[52] U.S. Cl. ..................... 285/137.1; 285/415; 285/420
[58] Field of Search ............ 285/62, 73, 137.1, 420, 285/414, 415, 405; 165/76, 78, 79, 80.1, 172, 180; 62/298, 313; 248/68.1

[56] References Cited

U.S. PATENT DOCUMENTS

| 426,121 | 4/1890 | Gennert | 285/50 |
|---|---|---|---|
| 2,906,975 | 9/1959 | Donohue et al. | 285/48 |
| 2,911,239 | 11/1959 | Marzolf, Sr. | 285/415 |
| 3,652,110 | 3/1972 | Manton . | |
| 3,682,422 | 8/1972 | Evans | 248/68.1 |
| 3,709,526 | 1/1973 | Cromie | 285/73 |
| 3,894,706 | 7/1975 | Mizusawa | 248/68.1 |
| 4,215,880 | 8/1990 | Trittipoe | 285/414 |
| 4,468,054 | 8/1984 | Orth | 285/137.1 |
| 4,899,964 | 2/1990 | Sick | 248/68.1 |
| 4,900,072 | 2/1990 | Bordner . | |
| 4,980,006 | 12/1990 | Bordner . | |
| 5,071,169 | 12/1991 | Moschet | 248/137.1 |
| 5,146,766 | 9/1992 | Martins | 285/137.1 |
| 5,169,178 | 12/1992 | Hunzinger | 285/137.1 |
| 5,174,612 | 12/1992 | Schnell | 285/414 |

FOREIGN PATENT DOCUMENTS

| 0101531 | 7/1937 | Australia | 285/50 |
|---|---|---|---|
| 26317 | 1/1961 | Japan . | |
| 60-43416 | 3/1985 | Japan . | |
| WO8600971 | 2/1986 | PCT Int'l Appl. . | |
| 308750 | 2/1969 | Sweden | 248/68.1 |
| 6709 | of 1886 | United Kingdom | 285/414 |
| 1238230 | 7/1971 | United Kingdom . | |
| 1350571 | 4/1974 | United Kingdom | 248/68.1 |

Primary Examiner—Eric K. Nicholson
Attorney, Agent, or Firm—Cushman, Darby & Cushman

[57] ABSTRACT

Aluminum pipes 63 and 65 are provided at the ends thereof with a flange unit 3 constructed by two separate flange sections 5 and 7 produced by injection moulding a plastic material selected from polypropylene, polyoximethylen, epoxy, polyester or nylon 66. As the plastic resin material, nylon 66 is most preferable. The flange sections 5 and 7 from semicircular grooves in which the pipes 63 and 65 are accommodated, and the sections 5 and 7 are moved toward each other to be brought into a face to face contact while projected portions 27 and 29 of the first section 5 are engaged with hook portions 59 and 61 of the second section 7. Then the sections 5 and 7 are connected to each other by a screw 7, to obtain an assembled state of the flange unit 3. With this flange assembly, a contact between different metal materials does not occur, and thus any corrosion of the pipes is substantially prevented.

8 Claims, 14 Drawing Sheets

Fig. 2-(a)
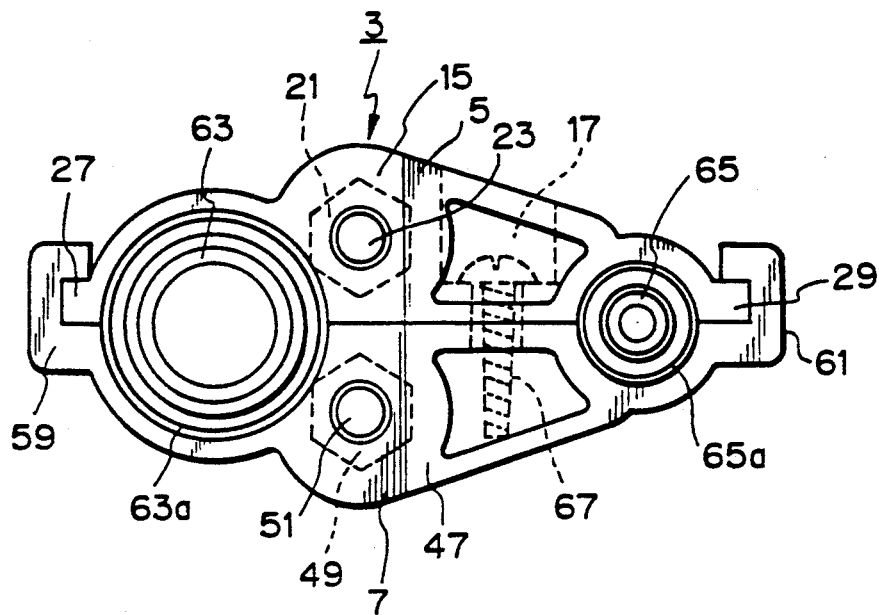
Fig. 2-(b)
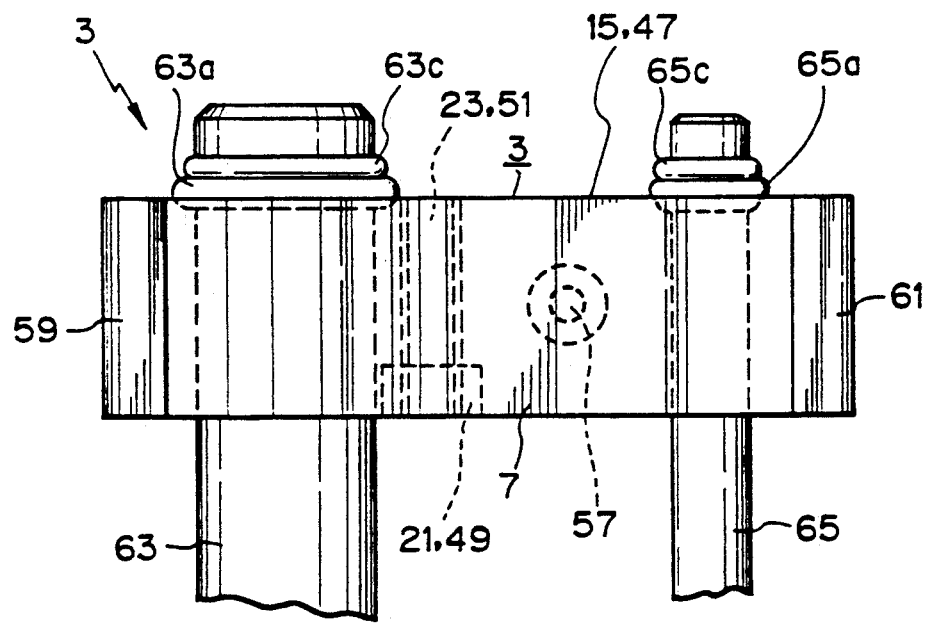

Fig. 3-(a)
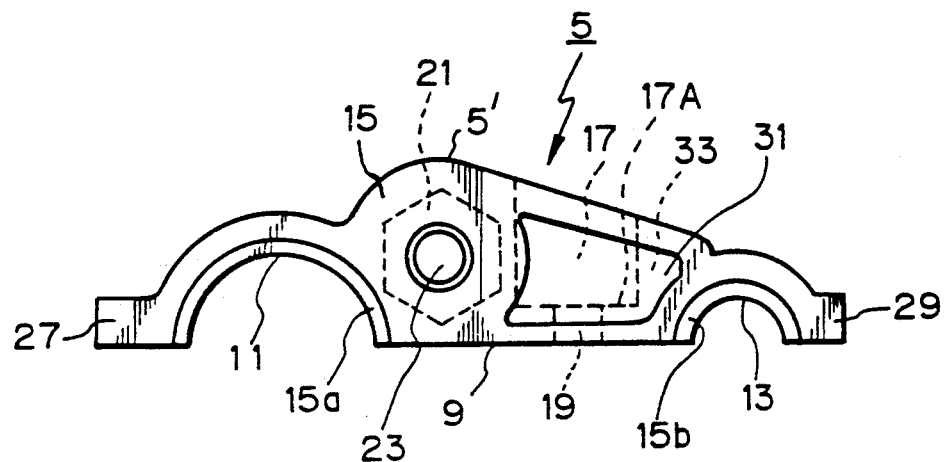
Fig. 3-(b)
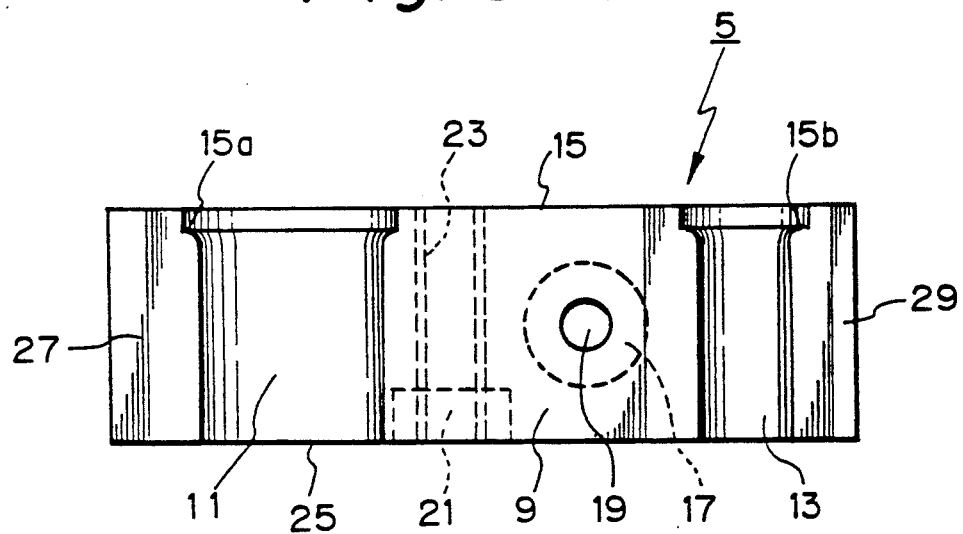

Fig. 4-(a)
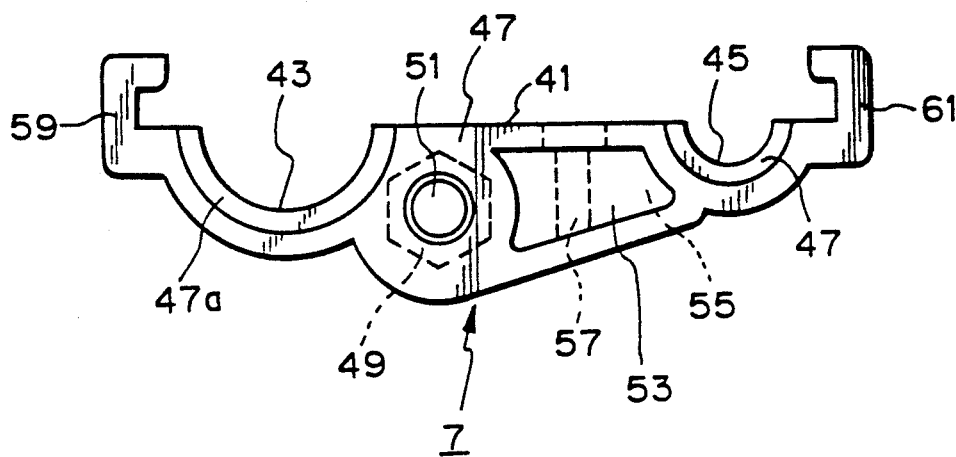
Fig. 4-(b)
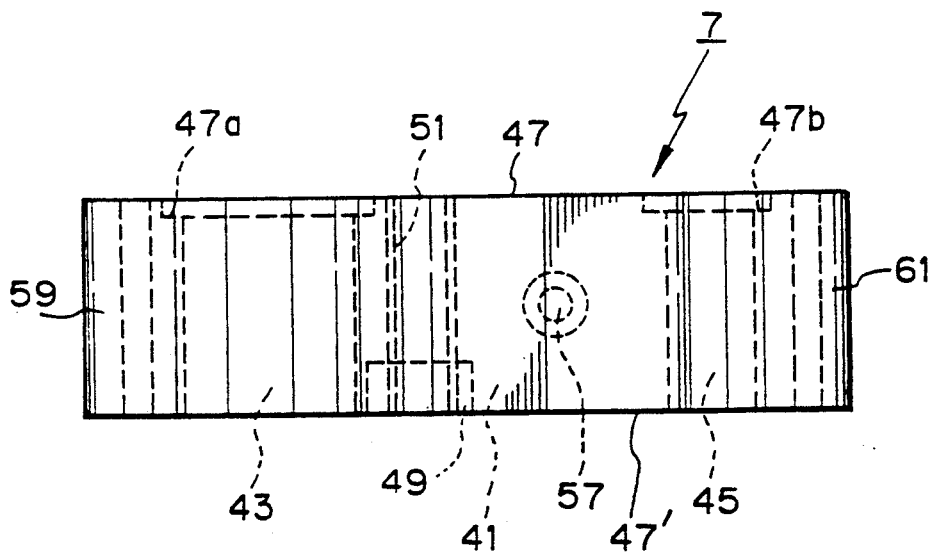

Fig. 9-(a)
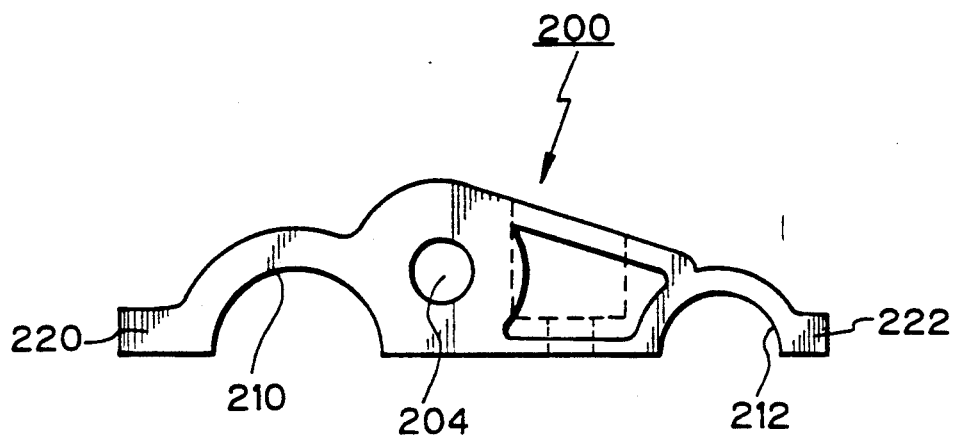
Fig. 9-(b)
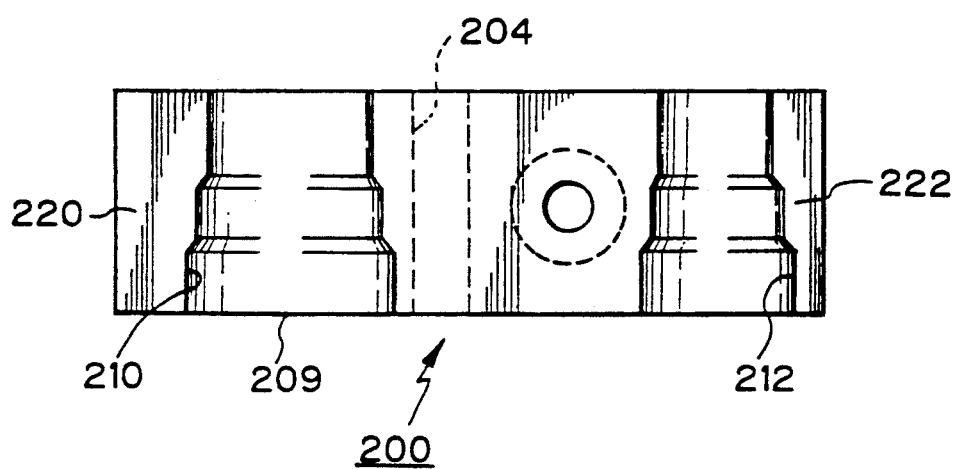

Fig. 10-(a)
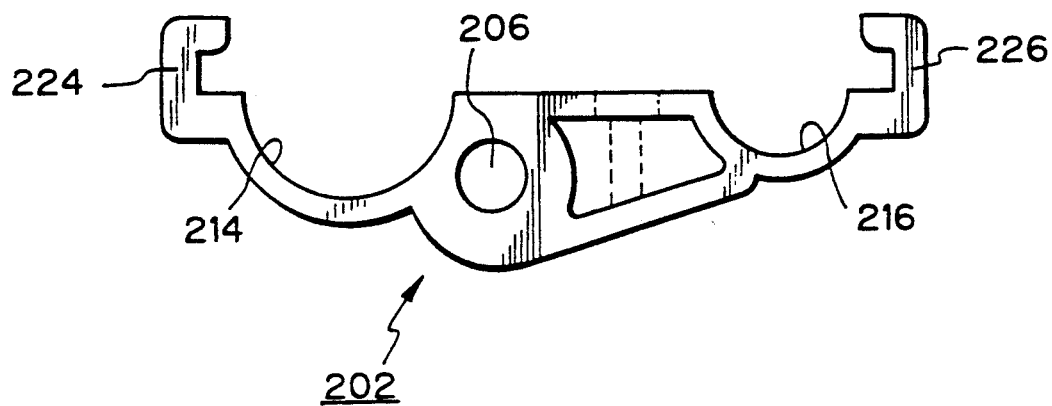
Fig. 10-(b)
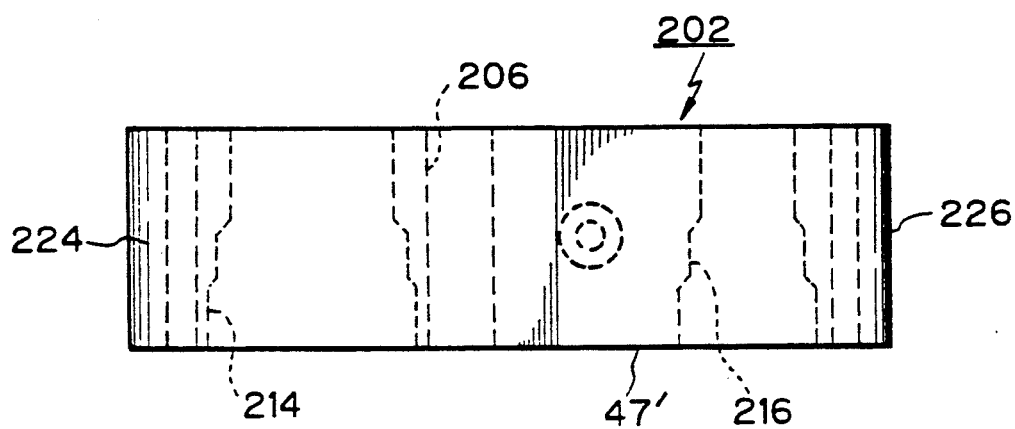

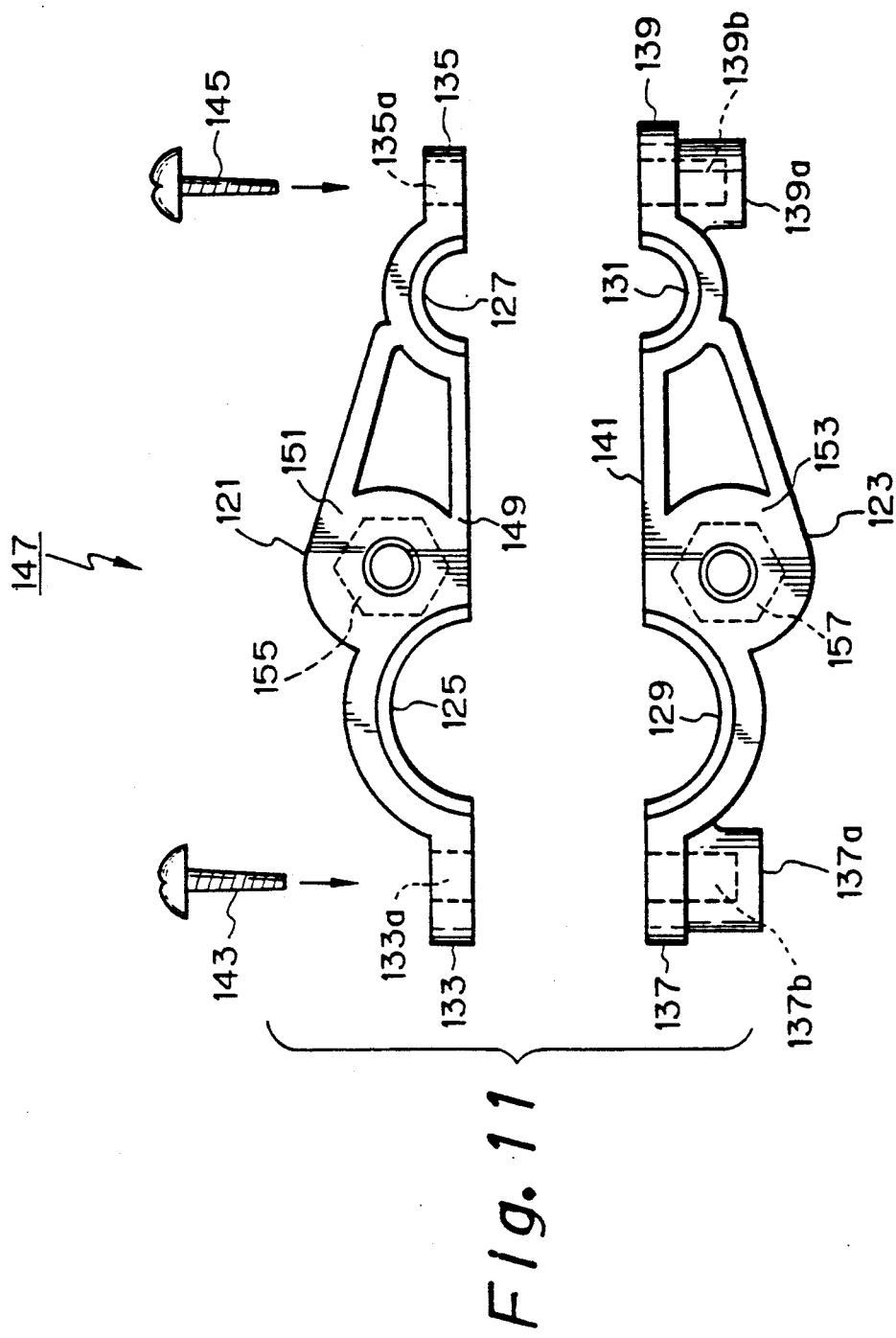

FLANGE COUPLING FOR CONNECTING PIPES FOR CARRYING REFRIGERANT DURING REFRIGERATING CYCLE

BACKGROUND OF THE INVENTION

1. Field of the Invention

The present invention relates to an air conditioning apparatus for an automobile, wherein a refrigeration cycle of a refrigerant is carried out, and more particularly, to a coupling for connecting pipes made of an aluminum material to thereby create passages for carrying the refrigerant.

Throughout the specification the term aluminum includes not only pure aluminum but also any alloy based on aluminum, except where otherwise defined.

2. Description of the Related Art

Current requirements for a reduction of the weight of an automobile, as much as possible, have led to a requirement for a similar reduction of the weight of an air conditioning apparatus used in the automobile. To reduce the weight of an air conditioning apparatus, pipe couplings used in the air conditioning apparatus must have as low a weight as possible, and to obtain such a light weight pipe coupling, a coupling has been proposed that is constructed by a pair of flanges made of aluminum and mounted at each ends of pipes to be connected. These flange members mounted at the ends of the pipes are connected to each other to thereby connect the pipes. (See Japanese Unexamined Patent Publication No. 60-43416).

Nevertheless, in view of the high pressure of the refrigerant flowing through the pipes, the strength of the pipe couplings constructed by the flanges made of aluminum is too low unless the flange is provided with a large outer diameter, but a flange having such a large outer flange is not desirable from the viewpoint of an efficient utilization of space.

Therefore, it has been proposed to use an inner flange made of a steel material and arranged between a pipe and an outer flange both made of aluminum. Such a construction, however, allows a contact between different materials, i.e., aluminum and steel, and this generates an electromotive force between the flange made of steel and the pipe made of aluminum, and accordingly, a more rapid corrosion of the metal parts. Depending on the components of the steel used for the flange, a corrosion of the pipes may occur, and thus the refrigerant under a high pressure may be leaked to the outside.

SUMMARY OF THE INVENTION

An object of the present invention is to provide a coupling device capable of overcoming the above difficulties of the prior art.

Another object of the present invention is to provide a high-strength coupling while preventing any contact between different metal materials.

According to the present invention, there is provided a pipe with a flange able to be connected to an adjacent body, defining a plane for connection and an opening for obtaining a communication thereof with a pipe, the flange defining a plane which is in face to face contact with the connection plane of the adjacent body when the flange is connected to that body, the flange being made of a nonconductive resin not allowing a flow of electricity therethrough.

BRIEF EXPLANATION OF THE DRAWINGS

FIG. 2-(a) is a top elevational view of a flange with pipes, according to the present invention;

FIG. 2-(b) is a side elevational view of the flange shown in FIG. 2-(a);

FIG. 3-(a) is a top elevational view of a first flange section in the flange assembly in FIG. 2;

FIG. 3-(b) is a side elevational view of a first flange section shown in FIG. 3-(a);

FIG. 4-(a) is a top elevational view of a second flange section shown in the flange assembly in FIG. 2;

FIG. 4-(b) is a side elevational view of the second flange section shown in FIG. 4-(a);

FIG. 9-(a) is a top elevational view of a first flange section shown in flange assembly used at the upper pipe shown in FIG. 8;

FIG. 9-(b) is a side elevational view of the first flange section shown in FIG. 9-(a);

FIG. 10-(a) is a top elevational view of a second flange section in the flange assembly used at the other pipe shown in FIG. 8;

FIG. 10-(b) is a side elevational view of the second flange section shown in FIG. 10-(a);

FIG. 11 is a top plan view of a second embodiment of the flange according to the present invention;

DESCRIPTION OF THE PREFERRED EMBODIMENTS

Figure 1:
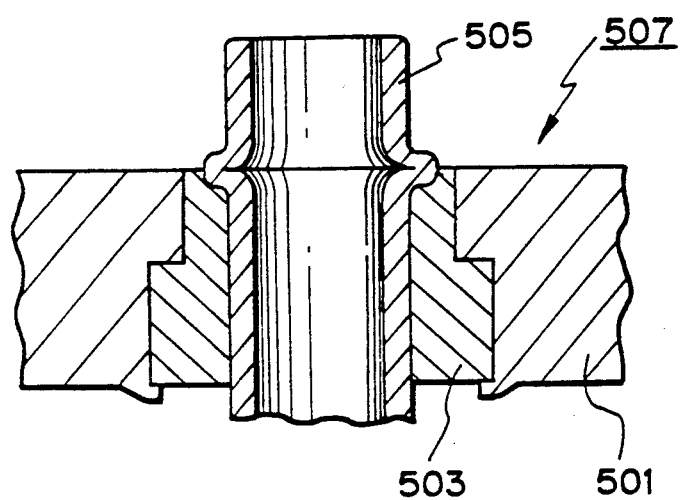
FIG. 1 shows a flange of the prior art.

FIG. 1 illustrates the problem in the prior art coupling to be solved by the present invention. In the prior art construction, an outer flange 501 made of aluminum is connected to an aluminum pipe 505 via an inner sleeve 503 made of steel. This aluminum-steel flange construction is used to obtain a desired strength while preventing an increase in weight. Nevertheless, a contact between different metal materials inevitably occurs, resulting in the generation of an electromotive force, and accordingly, a rapid corrosion thereof. The present invention aims to overcome this difficulty.

In FIGS. 2-(a) and 2-(b), showing a first embodiment of the present invention, a flange assembly 3 is connected to the top ends of pipes 63 and 65 for carrying a refrigerant. The flange assembly 3 is made of aluminum, and is constructed by separate flange sections 5 and 7. FIG. 3-(a) and 3-(b) are top plan and side elevational views, respectively, of the first flange section 5, and FIGS. 4-(a) and 4-(b) are a top plan and side elevational views, respectively, of the second flange section 7. These sections 5 and 7 are formed by an injection moulding process of a non-conductive resin material, preferably having a high strength and selected from resin materials such as nylon, polyprophylene, polyoximethylene, epoxy, or polyester. Among these materials, a resin of nylon 66 is most preferable.

As shown in FIGS. 3-(a) and 3-(b), the first flange section 5 has a surface 9 separating same from the second flange section 7, the plane of the surface 9 extending in parallel to the axes of the pipes 63 and 65, and upper and lower end surfaces 15 and 25 extending at a right angle to the axes of the pipes 63 and 65. The upper surface 15 allows a connection of the flange section 5 to an adjacent flange. The first flange section 5 has grooves 11 and 13 having a semi-circular cross section and extending vertically throughout the height of the section 5, so that the grooves 11, 13 open at the upper and lower end surfaces 15 and 25. The groove 11 and the second groove 13 have different diameters to each other, for receiving the pipes 63 and 65, respectively, each having a different diameter. The grooves 11 and 13 define, at respective upper ends thereof open at the top surface 15 for connection to an adjacent flange, annular stepped portions 15a and 15b for receiving bulged portions 63a and 65a of the pipes 63 and 65, respectively, as shown in FIG. 3-(b).

As shown in FIG. 3-(a), from the side opposite the surface 9, a depression 17 having a cylindrical shape and a bottom end 17A is formed so that it extends at a right angle to the surface 9, between the first and the second grooves 11 and 13 of the section 5. A bore 19, coaxial to the cylindrical groove 17, is also formed in the section 5. The bore 19 has a first end open to the bottom end 17A of the cylindrical depression 17 and a second end open to the division surface 9, and a nut 21 made of a metal material is located in the section 5 at a position between the first groove 11 and the cylindrical recess 17, and flush with the bottom plane 25. An insert moulding process is carried out whereby the nut 21 is set at a predetermined location in a mould when the plastic material is injected to the mould to obtain the flange section 5. The flange section 5 has a screw bore 23 extending coaxially from the nut 21 to the top surface 15, and the screw bore 23 has the same diameter as that of a screw bore of the nut 21. The first flange section 5 is provided on the same plane as the surface 9, with a pair of oppositely projecting portions 27 and 29. Furthermore, reference numerals 31 and 33 denote cut out portions of the connection surface 15 and the opposite surface 25, which do not adversely affect the operation of the connection device but reduce the total weight of the flange section 5.

The second flange section 7, as shown in FIGS. 4-(a) and 4-(b), has a surface 41 separating same from the first flange section 5, the plane of the surface 41 extending in parallel to the axes of pipes 63 and 65, and upper and lower end surfaces 47 and 47'. The upper surface 47 allows a connection of the flange section 7 to an adjacent flange. The second flange section 7 has grooves 47 and 45 having a semicircular cross section and extending vertically throughout the height of the section 7, so that the grooves 43 and 45 are open to the upper and lower end surfaces 47 and 47'. The groove 43 and the second groove 45 have different diameters to each other, for receiving the pipes 63 and 65, respectively, each having a different diameter. The grooves 43 and 45 define, at respective upper ends thereof open to the top wall 47, annular stepped recessed portions 47a and 47b.

As shown in FIG. 4-(a), from the surface, a screwed bore 57 is formed so that it extends at a right angle to the surface 41 between the first and the second groove 43 and 45 of the section 7. A nut 49 made of a metal material is located in the section 7 at a position between the first groove 43 and the cylindrical groove 45, and flush with the bottom plane 47'. An insert mounding process is carried out whereby the nut 49 is set at a predetermined location in a mould when the plastic material is injected to the mould to obtain the second flange section 7. The second flange section 7 has a screw bore 51 extending coaxially from the nut 49, and the screw bore 51 has the same diameter as that of a screw bore of the nut 49. The second flange section 7 is provided in the same plane as the surface 41, with a pair of opposite guide or hook portions 59 and 61. Furthermore, as with the first flange section 5, cut out portions 53 and 55 are provided in the top surface 47 and the bottom surface 47', to reduce the total weight of the flange section 7.

The structural difference between the second flange section 7 and the first flange section 5 is that, in place of the cylindrical depression 17 in the first section 5, the screw bore 57 is formed in the second section 7, and in place of the projected portions 27 and 29 of the first section 5, the guide or hook portions 59 and 61 are provided at the second section 7.

As will be easily seen from the above explanation, the nuts 21 and 49 are completely buried in the block of resin, and the grooves 11 and 13 in the first section 5 and the grooves 43 and 45 in the second section 7, in which the aluminum pipes 63 and 65 are held, are separated from each other by the respective inside surfaces of the resin flange sections 5 and 7.

Figure 5:
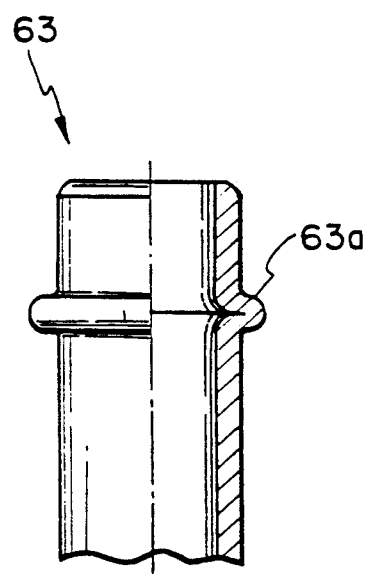
FIGS. 5 and 6 are cross sectional views of pipes shown in FIG. 2.
Figure 6:
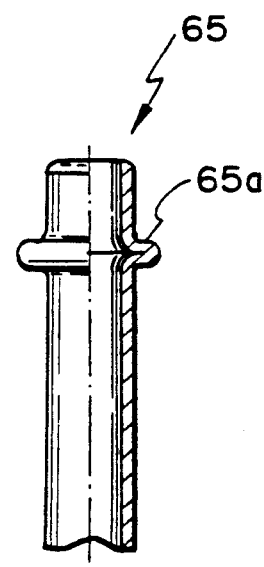

FIG. 5 shows a pipe 63 made of aluminum and used for carrying a refrigerant in an air conditioning apparatus for an automobile. One end of the pipe 63 is provided with an annular bulged portion 63a at the outer wall thereof, with which the flanges according to the present invention are engaged as fully described later. FIG. 6 show another pipe 65 made of aluminum and used for carrying a refrigerant in the air conditioning apparatus. The diameter of the second pipe 65 is smaller than that of the first pipe 63, but similar to the pipe 63, the pipe 65 is provided with an annular bulged portion 65a at the outer wall thereof.

Figure 7:
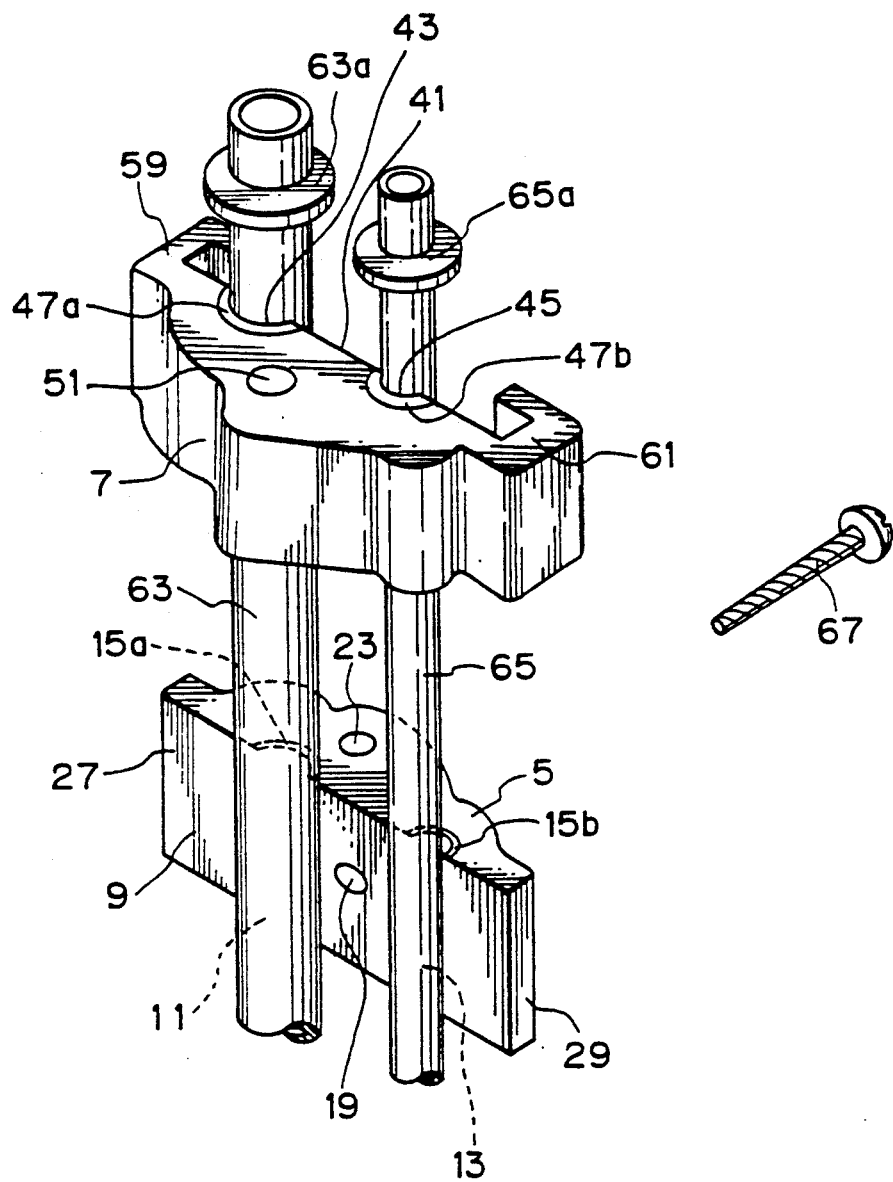
FIG. 7 is a perspective view of the flange shown in FIG. 2 when assembled to the pipes.

A connection of the divided flange assembly 3 according to the present invention with respect to the aluminum pipes 63 and 65 shown in FIGS. 5 and 6 will be explained. As shown in FIG. 7, the first flange section 5 is fitted to the pipes 63 and 65 in such a manner that the semicircular grooves 11 and 13 are engaged with the outer surfaces of the pipes 63 and 65, respectively. The second flange section 7 is located so as to face the first flange section 5, and is fitted to the pipes 63 and 65 in such a manner that the semicircular grooves 43 and 45 are engaged with the outer surfaces of the pipes 63 and 65, respectively. The first and the section flange sections 5 and 7 are then moved toward each other in such a manner that the projecting portions 27 and 29 are engaged with the guide or hook portions 59 and 61, respectively, whereby a combined flange assembly 3 is obtained. The combined sections 5 and 7 are then moved upward to a location at which the flange 3 is engaged with the bulged portions 63a at the stepped portions 15a and 47a of the first and second sections 5 and 7, respectively, and the bulged portions 65a are engaged with the stepped portions 15b and 47b of the first and second sections 5 and 7, respectively. Then, a screw 67 is inserted to the cylindrical depression 17 and the bore 19 of the first section 5, and is screwed into the screw bore 57 of the second section 7. A tightening of the screw 67 brings together the surfaces 9 and 41 of the sections 5 and 7, and the semicircular grooves 11 and 13, and 43 and 45 are firmly engaged with the outer surfaces of the pipes 63, and 65, respectively, to thereby obtain a secure connection between the flange unit 3 and the pipes 63 and 65 as shown in FIGS. 2-(a) and 2-(b). Note, the screw 67 cannot come into contact with the pipes 63 and 65, and thus a metal contact between different kinds of metal materials is prevented.

Figure 8:
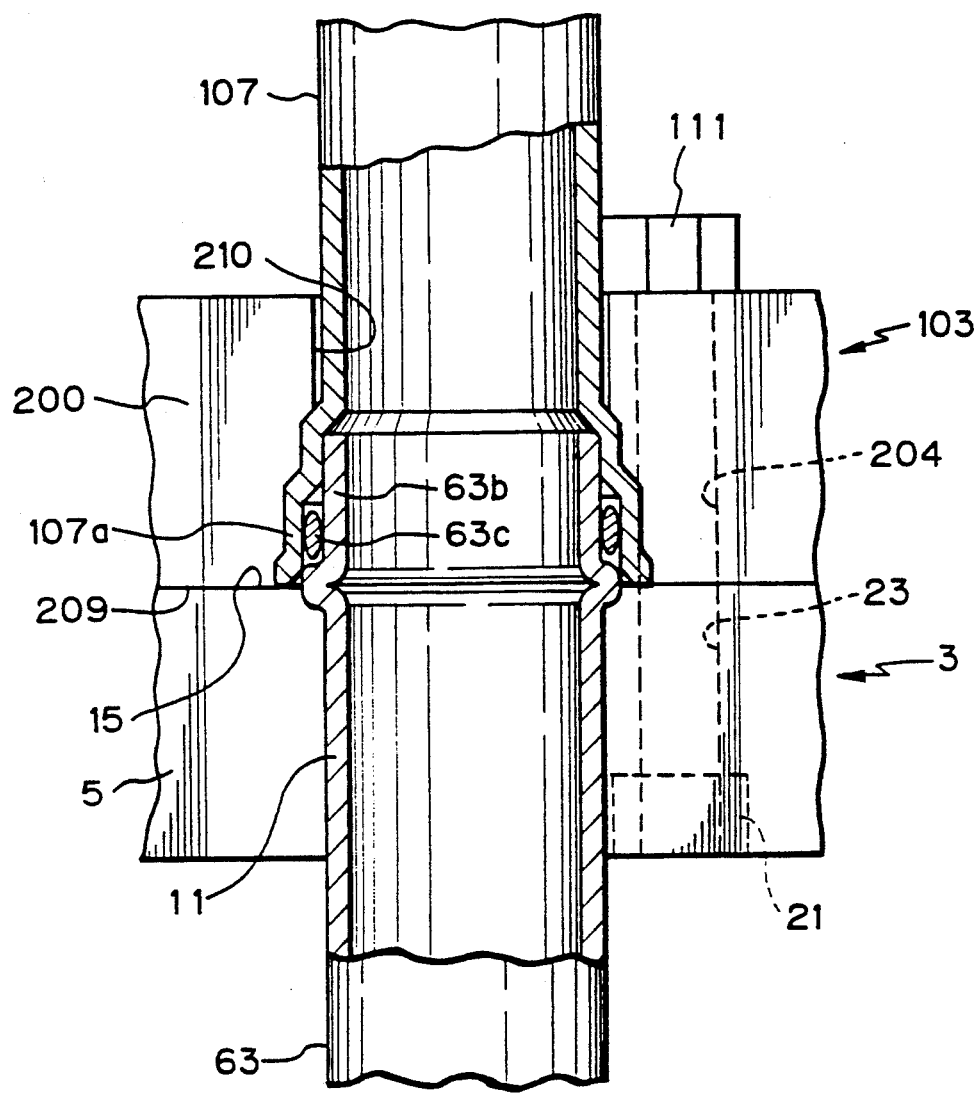
FIG. 8 is a partial cross sectional view of the flange and pipe shown in FIG. 2, when connected to another pipe with a flange.

FIG. 8 illustrates the construction of a coupling for connecting pipes according to the present invention. The upper end of the pipe 63 is provided with the flange assembly 3 having the construction as shown in FIGS. 3 and 4, and one end of the pipe 107 to be connected to the pipe 63 is provided with a flange assembly 103 constructed by a pair of divided flange sections 200 (FIGS. 9-(a) and 9-(b)) and 202 (FIGS. 10-(a) and 10-(b)) having substantially the same construction as that of the flange sections 5 and 7, respectively, of the flange unit 3. The flange sections 200 and 202 differ, however, from the sections 5 and 7 of the fitting 1 in that the flange sections 200 and 202, as shown in FIGS. 9-(a) and 9-(b) and 10-(a) and 10-(b), respectively, are not provided with the nuts 21 and 49 as in the first flange unit 3, but only with bores 204 and 206. The second difference lies in the configuration of the semicircular grooves 210 and 212 of the first section 200 and the semicircular grooves 214 and 216 of the second section 202. The semi-circular grooves 210 and 210, and 214 and 216 have, as shown in FIGS. 9-(b) and 10-(b), a downwardly widened stepped shape, which allows a bottom end 107a of the pipe 107 (FIG. 8) having a stepped cross sectional shape to be neatly fitted therein.

The thus-constructed first flange section 200 and second flange section 202 are fitted to bottom end of the pipe 107, and the first and second sections 200 and 202 are engaged with each other by projections 220 and 222 and guides 224 and 226, as with the projections 27 and 29 and the guides 59 and 61 explained with reference to FIG. 7. The first and second sections 200 and 202 are then connected to each other by a nut, which is similar to the nut 67 in FIG. 7, whereby the second flange assembly 103 is securely connected to the pipe 107.

A connection of the pipes 63 and 107 by the lower and upper flange assemblies 3 and 103 will be explained. As shown in FIG. 8, the first flange unit 3 constructed by the flange sections 5 and 7 with the pipes 63 and 65, and the second flange unit 103 constructed by the flange sections 200 and 202 with the pipe 107 and a not shown pipe are brought together at the top surface 15 and the bottom surface 209 thereof, respectively, so that the upper end of the pipe 63 is inserted to the bottom widened bore 210 of the pipe 107, whereby the first flange assembly 3 fixed to the pipe 63 is brought into end to end contact with the second flange assembly 103 fixed to the pipe 107. An O-ring 63c is arranged in an annular space formed between the pipes 63 and 107. Bolts 111 are then inserted to the bores 204 and 206, respectively, of the upper flange assembly 103, and are screwed, via the respective bores 23 and 51, to the nuts 21 and 49, respectively, of the lower flange unit 3, and as a result, an air tight connection is obtained between the upper end of the pipe 63 and the bottom end 107a of the pipe 107 via the O-ring 63c. In the same way, the pipe 65 (FIG. 7), to which the first flange 3 is connected, is connected to a not shown pipe to which the second flange 103 is connected.

According to the present invention, the flange units 3 and 103 made of a resin material prevent any contact between different kinds of metal materials, even though the pipes 63, 65 and 107 are made of aluminum, and as a result, corrosion of the pipes 63, 65 and 108 is prevented. Note, the bolts 111 cannot come into contact with the pipes 63, 65, and 107.

FIG. 11 illustrates a flange assembly 147 as a second embodiment of the present invention and constructed by flanges 121 and 123. This embodiment is different from the first embodiment in that, in place of the cylindrical depression 17, bore 19 and screw bore 57 in the first embodiment, the ends of the flanges 121 and 123 are provided with connection parts 133, 135, 137, and 139, i.e., the guide or hook portions 59 and 61 of the first embodiment are omitted. Note, the guide portions 59 and 61 can be provided if they do not adversely affect the screw-fitting operation described later. The connection portions 133 and 135 of the flange section 121 are provided with bores 133a and 135a, respectively, for receiving screws, and the connection portions 137 and 139 of the flange 123 are provided with portions 137a and 139a projecting at a right angle to the surface 141. Screw bores 137b and 139b extend from the surface 141 to the surface 149 within the projecting portions 137a and 139b, respectively.

Figure 12:
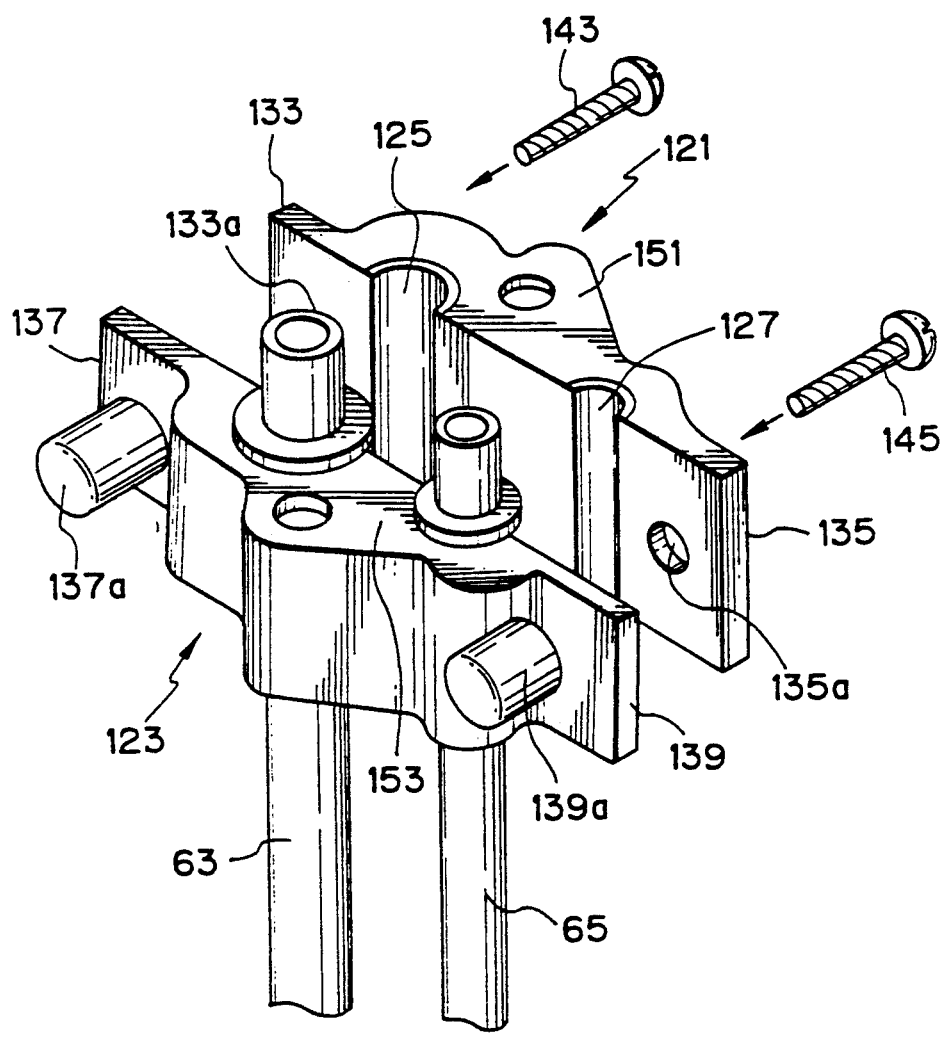
FIG. 12 is perspective view of the flange shown in FIG. 11, when assembled to the pipes.

When the flange shown in FIG. 11 is connected to the pipes 63 and 65, the flange sections 121 and 123, as shown in FIG. 12, face each other via the pipes 63 and 65, so that the semi-circular recesses 125 and 129 are fitted to the pipe 63 and the semi-circular recesses 127 and 131 are fitted to the pipe 65. Screws 143 and 145 are introduced into bores 133a and 135a, respectively, of the first flange section 121, and are screwed into the screw bores 137b and 139b, respectively, of the second flange section 123. The screws 143 and 145 are then tightened down to connect the first and second flange sections 121 and 123 to each other while sandwiching the pipes 63 and 65 between the sections 121 and 123, to thus obtain an assembled flange fitting 147. In this assembled state, there is no metal contact between the screws 143 and 145 and the pipes 63 and 65 for carrying the refrigerant.

Figure 13:
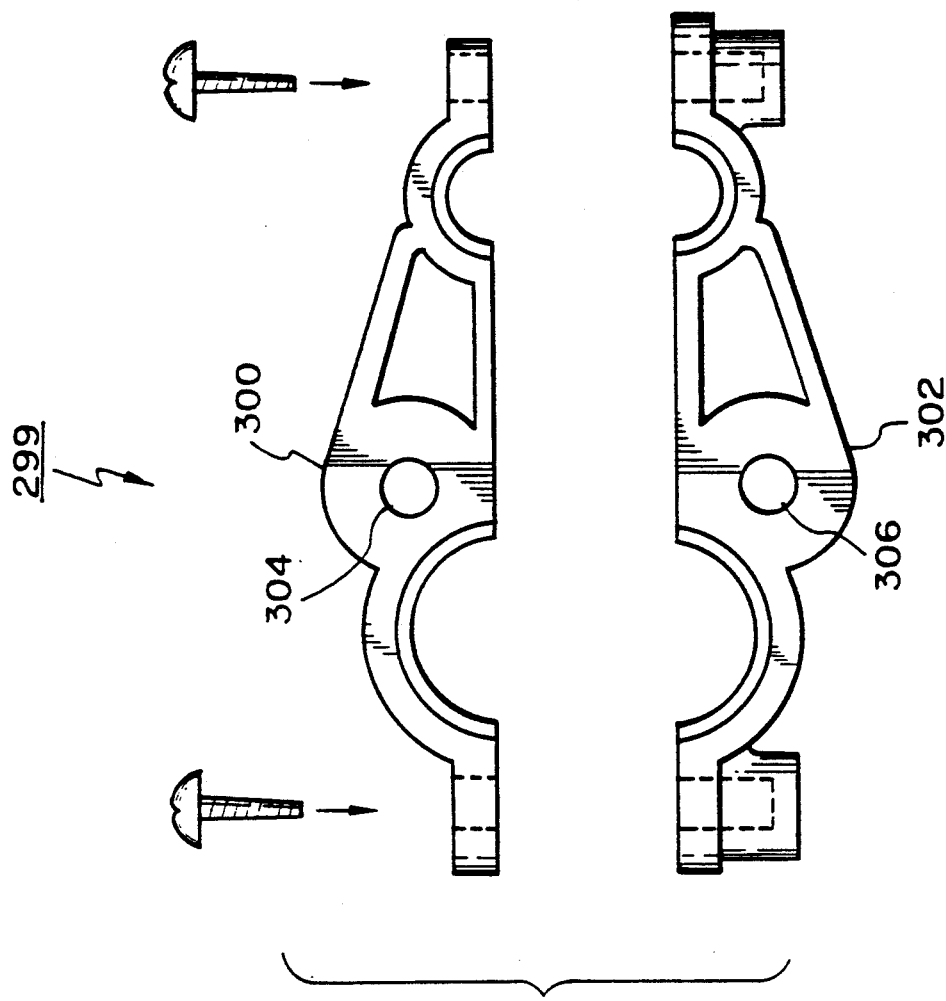
FIG. 13 is a top plan view of a flange used at another pipe as shown in FIG. 11.

In the embodiment shown in FIGS. 11 and 12, the surfaces 141 and 149 of the flange sections 121 and 123 are in close contact with each other, and the flange sections 121 and 123 are firmly connected to the pipes 63 and 65 at the pairs of semicircular recesses 125 and 129, and 127 and 131. FIG. 13 shows a second flange assembly connected to pipes to be connected to the pipes 63 and 65, respectively. The second flange assembly 299 constructed by first and second flange sections 300 and 302 has the same construction except that the first and second sections 300 and 302 have only the bores 304 and 306 for an introduction of bolts therethrough. To connect the pipes 63 and 65 held by the first flange assembly 147 to not shown respectively pipes held by the second flange assembly 299, bolts are introduced into the bores 304 and 306 in the second flange assembly 299, and are screwed into nuts 155 and 157 (FIG. 11) in the first and second sections 121 and 123 of the first flange assembly 147, and as a result, an interconnection of the respective pipes is obtained by the use of the flange fittings 147 and 299.

The flange 147 is also formed from a non-conductive resin material, and as a result, any contact between different kinds of metals is prevented, and accordingly, the pipes 63 and 65 for carrying a refrigerant are not subjected to corrosion.

Figure 14:
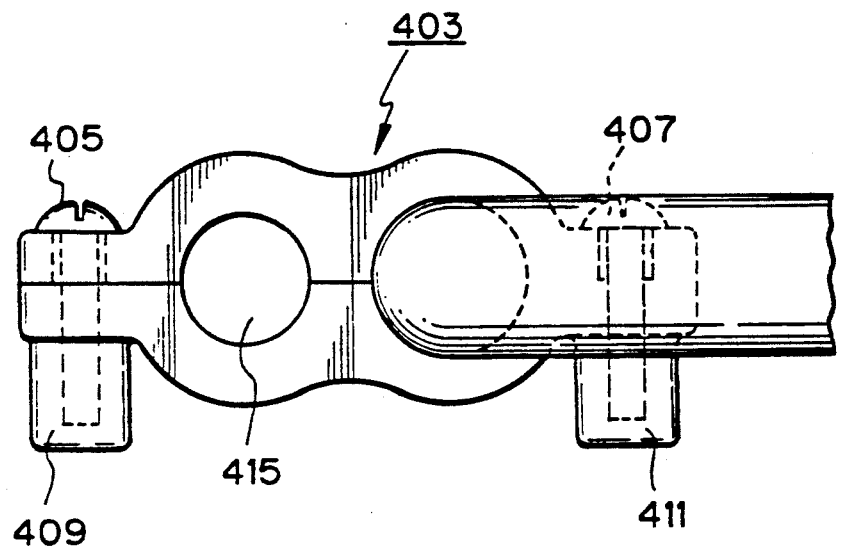
FIG. 14 is a top plan view of a third embodiment of the flange according to the present invention, when used for a single refrigerant pipe.

The above embodiments are directed to a flange device capable of connecting more than one pipe made of aluminum, but the flange 403 in FIG. 14 can be used to connect only one aluminum pipe 401. In this embodiment, the screws 405 and 407 are tightened to connected respective projected portions 409 and 411, to thus connect the pipe for carrying a refrigerant. The flange assembly 403 is provided with a bore 415, and a connecting surface 417 in contact with an adjacent flange 430 to which it is to be connected, in a face to face contact. A bolt is inserted to the bore 415 and is screwed into a screw bore 432, whereby the pipes are connected to each other.

In the above embodiments, each of the flanges 3, 103, 147 and 403 is divided into two sections, but the flanges can be made as one body; by moulding. In this case, before the respective bulged portions thereof 63a and 65a in FIGS. 5 and 6, respectively, are formed, the pipes are inserted to the respective flange, and the bulged portions are then formed in the pipes, to be engaged with the respective flanges.

The following table shows examples of the resin materials used for forming the flanges according to the present invention, which resins can provide a desired strength and lower weight while preventing corrosion.

| No. Resin | Filler (wt %) | Tensile Strength (kg/mm$^2$) | Bending Strength (kg/mm$^2$) | Bending Modulus (kg/mm$^2$) | Thermal Expansion Factor ($\times 10^{-5}/°C.$) |
|---|---|---|---|---|---|
| 1 polypropylene | 30 | 4.8 | 5.3 | 280 | 3.9 |
| 2 polyoximethylen | 25 | 9.0 | 19.7* | 430 | 3.0 |
| 3 nylon 66 | 30 | 10.6 | 16.0 | 500 | 3.0 |

*Measured at 23° C. Others are measured at 80° C.

Figure 16:
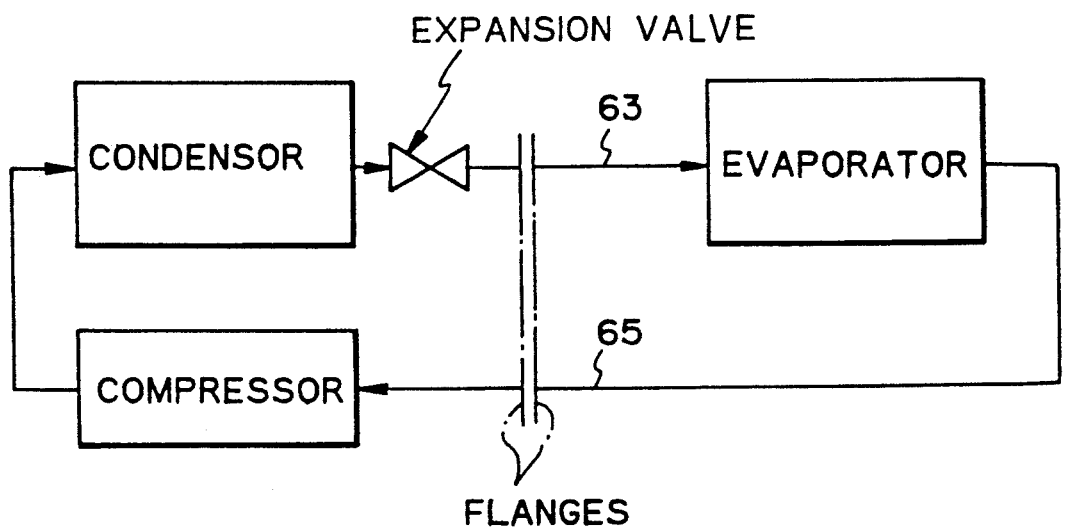
FIG. 16 illustrates an arrangement of the pipes coupled with flanges according to the present invention, in a refrigerant line for a refrigerating cycle in an air conditioning apparatus for an automobile.

The use of a resin material such as an epoxy resin and polyester resin for the flange provides the following advantages. The pipes connected by these flanges are used in a refrigerating cycle at a location near an expansion valve, as shown in FIG. 16, in such a manner that the pipe 63 is located between an expansion valve and an evaporator and the pipe 65 is located between the evaporator and a compressor. Namely, in the pipe 63, a refrigerant flowing at a temperature of as low as 2° C. flows from the expansion valve in a mist state, and in the pipe 65, the refrigerant flowing from the evaporator to the compressor, and having a temperature as high as 80° C. flows from the compressor to the expansion valve via a condenser, and thus a large temperature gradient is created in the flange. A flange made of plastic material according to the present invention is not affected by such a large temperature gradient across the flange.

Figure 15:
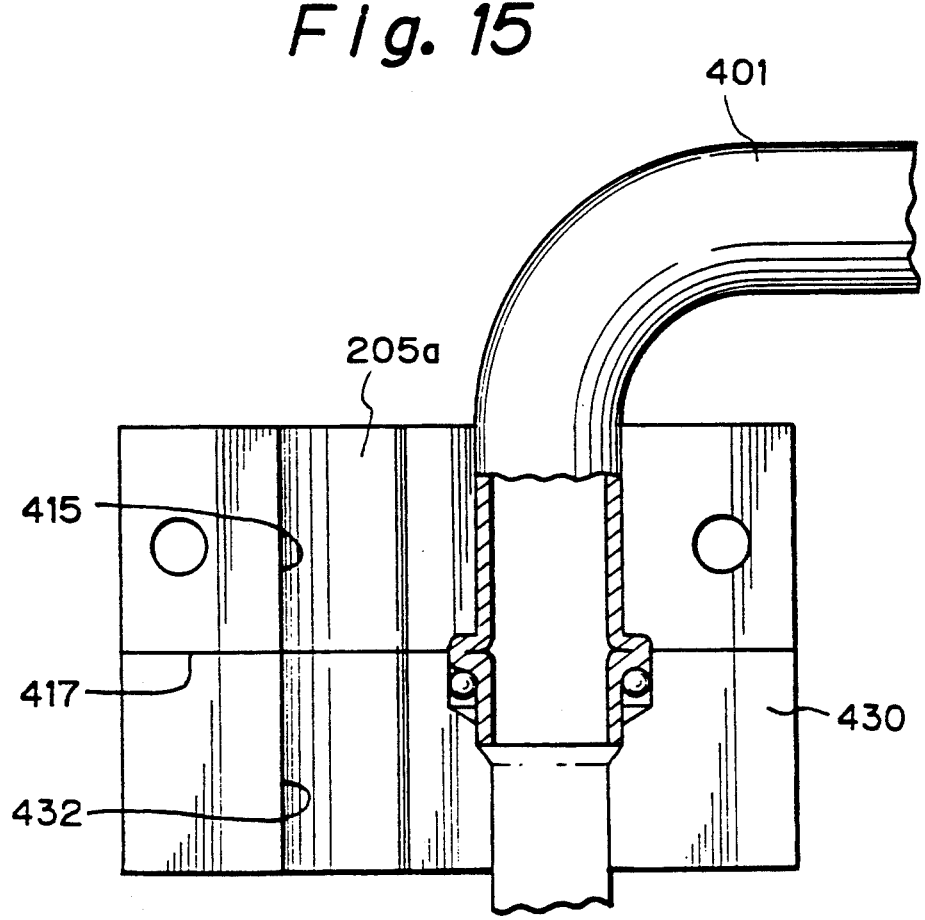
FIG. 15 is a side plan view of the flange shown in FIG. 14.

In the embodiment shown in FIGS. 14 and 15, a single pipe line is used, and in this case, a temperature difference also will be created between an operated condition of the air conditioning apparatus and an off condition of the apparatus. Therefore, the flange in the embodiment in FIGS. 14 and 15, formed of a plastic resin material, is also not affected by a large temperature gradient.

Furthermore, in the prior art construction of an air conditioning apparatus for an automobile, wherein the flanges are made of a metal material, an excess load is apt to be created in the pipes when made of aluminum. Contrary to this, the flange formed of a plastic material according to the present invention reduces the load applied to the pipes because of a lower weight to volume ratio and a larger strength to weight ratio thereof.

It should be further noted that a plastic material is much harder than steel, and has a hardness value close to that of aluminum. Therefore, the pipes are not damaged by a possible contact caused by a vibration generated when the automobile is moving.

In the embodiment as illustrated in FIG. 2, the flange sections 5 and 7 are connected by screws 67, but the engagement of the projected portions 27 and 29 with the hook portions 59 and 61, respectively, makes it possible to eliminate such a screw connection means.

Furthermore, the nuts 21 and 49 in FIG. 2 are not necessarily insert-moulded in the respective flange sections, and separate nuts can be used instead. Furthermore, instead of the nuts 21 and 49, the flange sections 5 and 7 may be provided with respective screw bores with which the bolts 111 are screw engaged.

Although the present invention is described with reference to the attached drawings, many modifications and changes can be made by those skilled in this art without departing from the scope and spirit of the present invention.

We claim:

1. A pipe for carrying refrigerant and having a flange able to be connected to a body adjacent thereto, said body defining a connection surface extending at a right angle to a longitudinal axis of the pipe and an opening extending longitudinally up to said connection surface, said pipe being made from an aluminum material and said flange defining a connection surface arranged to be in face to face contact with the connection surface of the body when the flange is connected to the body, said flange being made of a non-conductive plastic material, said flange comprising a pair of separate flange sections having end surfaces which are parallel with respect to the longitudinal axis of the pipe and a recess for receiving the pipe, the flange sections being arranged so as to contact with each other at said faced surfaces, while said pipe is fitted to the recess, and at least one screw member which extends substantially transverse to the longitudinal axis of the pipe, said screw member connecting the separate flange sections to each other in such a manner that the pipe is fixed securely between the two flange sections.

2. A pipe according to claim 1, wherein one of the flange sections is provided with hook-shaped portions which are axially and slidably engaged with the ends of the other flange section.

3. A pipe according to claim 1, wherein one of the flange sections is provided with a bore extending at a right angle to the axis of the pipe, said screw member being inserted into said bore and screwed to a screw bore formed in the other of the flange sections, whereby the first and the second flange actions are connected to each other.

4. A pipe according to claim 1, further comprising a nut for connecting the pipe with said body, the nut being moulded within the flange made of the plastic material.

5. A pipe according to claim 1, wherein one end of said pipe is formed into an annular bulged portion, and said flange sections form, at an end of said opening adjacent to the connection surface, an annular stepped recess with which the bulged portion of the pipe is engaged when the pipe and the flange are connected to said body.

6. A pipe according to claim 1, wherein said flange is made of the plastic material selected from polypropylene, polyoximethylene, epoxy, polyester or nylon 66.

7. A pipe connection device for an end to end connection of pipes made of aluminum comprising:
a pair of first and second flanges for holding respective pipes thereby, said flange defining connection surfaces in contact with each other and extending substantially at a right angle to longitudinal axes of the pipe, said flanges defining bores through which the respective pipes extend up to the respective connection surface, the respective pipes having annular projections engaging edges of the respective bores to prevent said pipes from being withdrawn from the facing connection surface; and
means for tightening the first and second flanges so that the facing connection surfaces are engaged with each other;
said first and second flanges being made of a non-conducting plastic material,
each of said first and second flanges comprising a pair of separate flange sections having end surfaces which are parallel with respect to the longitudinal axes of the pipes and a recess for receiving the pipe, the flange sections being arranged so as to contact with each other at said faced end surfaces while said pipe is fitted to the recess, and at least one screw member which extends substantially transverse to the longitudinal axis of the pipe, said screw member connecting the flange sections to each other in such a manner that the respective pipe is fixed securely between the two flange sections.

8. A pipe connection device according to claim 7, wherein said first and second flanges form bores extending along a direction parallel to the axes of the pipes and being aligned with each other when the first and second flanges are connected to each other, said tightening means comprise bolts and nuts, said bolts being inserted to the bores in one of the first and second flanges and being screw engaged in the nuts in the other of the first and second flanges, the nut being moulded in said other of the first and second flanges.

* * * * *